No. 749,976. PATENTED JAN. 19, 1904.
R. L. TURNER.
ANGLE INDICATOR.
APPLICATION FILED MAY 21, 1903.
NO MODEL.

Witnesses:
David C. Walter
S. A. Dorland.

Inventor:
Robert L. Turner,
By Hinman Hall, His Atty.

No. 749,976.  Patented January 19, 1904.

UNITED STATES PATENT OFFICE.

ROBERT L. TURNER, OF TOLEDO, OHIO.

ANGLE-INDICATOR.

SPECIFICATION forming part of Letters Patent No. 749,976, dated January 19, 1904.

Application filed May 21, 1903. Serial No. 158,061. (No model.)

*To all whom it may concern:*

Be it known that I, ROBERT L. TURNER, a citizen of the United States, residing at Toledo, in the county of Lucas and State of Ohio, have invented certain new and useful Improvements in Angle-Indicators; and I do declare the following to be a full, clear, and exact description of the invention, such as will enable others skilled in the art to which it appertains to make and use the same, reference being had to the accompanying drawings, and to the figures of reference marked thereon, which form a part of this specification.

A common difficulty encountered by users of spectacles is that the bridge or nose-piece of the spectacles which rests upon the ridge of the nose is inclined at a different angle from the angle of the front line of the nose, and therefore the edge or corner of either top or bottom of the bridge or nose-piece rests uncomfortably upon the nose, causing a painful and unsightly crease in the flesh of the nose. It is desirable that the angle of the inner face of the spectacle-bridge to the plane of the lenses of the spectacles shall exactly conform to the formation of the nose.

My invention relates to a device for indicating the angle of the nose at the point where the spectacle-bridge rests and for indicating and determining the angle of the spectacle-bridge to the plane of the lenses.

My invention is designed to provide a convenient instrument for the use of oculists and opticians by means of which the oculist may by the use of the instrument determine the true angle of the nose to the plane of the lenses to be furnished to his patient, so that the oculist may in his prescription indicate to the optician exactly the angle of the bridge to be furnished, and which prescription will enable the optician in filling the prescription to furnish a bridge of the required angle. I attain these objects by means of the devices and arrangement of parts hereinafter described and shown, and illustrated in the accompanying drawings, in which—

Figure 1:
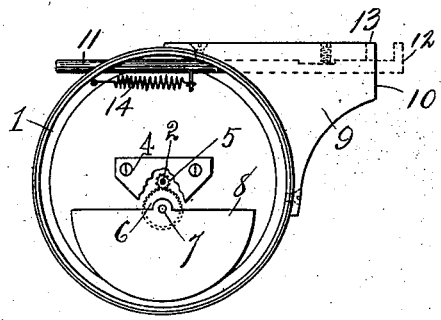
Figure 2:
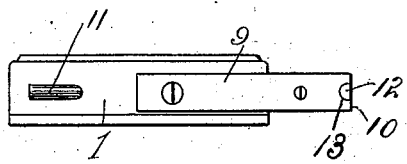
Figure 3:
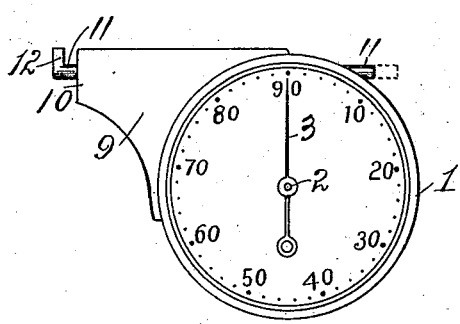

Figure 1 is a back view of my instrument with the cover removed and showing a portion of the bridge hereinafter referred to broken away; Fig. 2, a top plan view of the same; and Fig. 3 a front view of the same, showing the dial and the indicating-hand hereinafter referred to.

Like numerals of reference indicate like parts throughout the drawings.

In the drawings, 1 is a case of about the size of an ordinary watch, having a dial-plate protected by a "crystal" and having a rim and removable back. The dial-plate is circumferentially graduated to indicate from one to ninety degrees.

2 is a central arbor, the outer extremity of which carries an indicator-hand 3. This arbor is journaled in the dial-plate near one end and at its other end in a bridge or bracket 4, secured to the inner side of the dial-plate.

Upon the arbor 2 between the bridge and the back of the dial-plate is a pinion 5, which meshes with a four-to-one gear-wheel 6 upon an arbor 7, journaled in the back of the dial-case and the bridge 4. On the inner projecting end of the arbor 7 is secured a weight 8, which when the case is turned, always by its own gravity, occupies the bottom of the chamber of the case. The arrangement of the four-to-one gear 5 6 is such that a quarter-turn of the case 1 will cause the indicating-hand to make an entire revolution over the dial-plate.

9 is an arm or bracket projecting from one side of the case at what may be regarded as its top. The outer extremity (hereinafter termed the "bearing-surface") of this arm is flat, as at 10, and lies in a plane parallel with the indicating-hand when it points to ninety degrees.

11 is a rod passing through a hole in the top of the arm and through the top of the case, one end of the rod being turned upwardly, as at 12. In the face 10 of the arm or bracket 9 is a recess, (indicated by dotted lines in Fig. 1,) as at 13, for the reception of the upturned portion 12. The opposite end of the rod 11 projects through and beyond the rim of the case 1. Within the case is a spring 14, one end of which is secured to the case, the other end being connected with the rod 11. The spring holds the rod normally retracted, so that the upturned jaw portion 12 of the rod 11 rests in the recess 13.

The operation of my device is as follows:

To ascertain the angle of the front line of the nose at the point where the spectacle-bridge rests, the face is placed in such position that the lenses of the proposed spectacles would lie in a vertical plane. The bearing-surface 10 of the arm or bracket 9 is placed upon the nose at the point where the spectacle-bridge should rest. The weight 8 now swings on its bearing and through the gear 5 6 turns the indicating-hand to the point on the dial indicating the number of degrees of the angle to the vertical in which the plane 10 now rests. It is now only necessary for the oculist to communicate this number to the optician to enable him to furnish a bridge of the desired angle. This is done by pressing upon the projecting end of the rod 11, which opens the jaw 12 at the opposite end of the rod. The spectacle-bridge is now placed edgewise into the open jaw and the rod is released. The spectacle-bridge will now be clasped or clamped in the jaw 12 upon the bearing-surface 10. Now if the lenses be swung into a vertical plane (which for all practical purposes may be determined with sufficient accuracy merely by the eye of the skilled workman) the weight will swing in the case and will cause the indicator-hand to point to the proper degree-indicating number. The spectacle-bridge may be bent, or different frames may be thus tried until the bridge having the proper angle is found.

It will be obvious to those skilled in the art that my instrument may be employed for measuring and indicating the angle to the vertical of various objects.

Having described my invention, what I claim, and desire to secure by Letters Patent, is—

1. In an instrument of the described class, a case, a dial having a bearing-surface adapted and arranged to contact with the bridge of the nose, an indicator adapted to indicate from one to ninety degrees, a weight mounted and adapted to swing in said case, and a four-to-one gear and pinion which communicate the motion of the weight to the indicator.

2. In an instrument of the described class, a case, a graduated dial, an indicator for the dial, a weight which coöperates with said dial and indicator, a bearing-surface upon the case arranged in such relation to the dial and indicator that the angle of the bearing-face to the vertical is indicated, and means for clamping upon said bearing-surface the object the angle of which is to be measured.

3. An instrument of the described class comprising a case, a dial on the case graduated from one to ninety degrees, an indicator for the dial, a weight within the case, a four-to-one gear intermediate the weight and indicator, a bearing-surface supported by the case and means for clamping upon the bearing-surface the object the angle of which is to be measured.

In testimony whereof I affix my signature in presence of two witnesses.

ROBERT L. TURNER.

Witnesses:
   RUPERT HOLLAND,
   S. A. DORLAND.